(12) United States Patent
Van Der Velden

(10) Patent No.: US 8,413,392 B2
(45) Date of Patent: Apr. 9, 2013

(54) STABLE FLOOR ELEMENT

(75) Inventor: Gert Van Der Velden, Meer (BE)

(73) Assignee: VDV R&D BVBA, Rijkevorsel (BE)

( * ) Notice: Subject to any disclaimer, the term of this patent is extended or adjusted under 35 U.S.C. 154(b) by 0 days.

(21) Appl. No.: 12/991,797

(22) PCT Filed: May 7, 2009

(86) PCT No.: PCT/IB2009/051888
§ 371 (c)(1),
(2), (4) Date: Nov. 9, 2010

(87) PCT Pub. No.: WO2009/136376
PCT Pub. Date: Nov. 12, 2009

(65) Prior Publication Data
US 2011/0056154 A1 Mar. 10, 2011

(30) Foreign Application Priority Data

May 9, 2008 (BE) .................................. 2008/0265

(51) Int. Cl.
*E04F 15/00* (2006.01)
(52) U.S. Cl. ............................. 52/181; 52/177; 52/302.1
(58) Field of Classification Search ............... 52/181, 52/403.1, 177, 302.1, 465, 471; 404/4, 5, 404/21, 32, 47–50
See application file for complete search history.

(56) References Cited

U.S. PATENT DOCUMENTS

| 18,417 A | * | 10/1857 | Titus et al. ....................... 404/21 |
| 98,480 A | * | 1/1870 | Farrar ............................... 404/18 |
| 107,352 A | * | 9/1870 | Fitzgibbons .................... 404/39 |
| 1,378,483 A | * | 5/1921 | Olson ........................... 52/126.5 |
| 1,883,994 A | * | 10/1932 | Lee ................................ 52/181 |
| 3,334,456 A | * | 8/1967 | Naka .............................. 52/179 |
| 3,557,669 A | | 1/1971 | Fenton |
| 5,205,092 A | * | 4/1993 | Taylor ............................ 52/177 |
| 5,758,462 A | * | 6/1998 | Finn ............................. 52/302.1 |

FOREIGN PATENT DOCUMENTS

| AT | 301137 B | 8/1972 |
| DE | 1173718 B | 7/1964 |
| DE | 1964021 A1 | 7/1971 |
| EP | 1563728 A1 | 8/2005 |
| GB | 2437404 A | 10/2007 |

* cited by examiner

*Primary Examiner* — William Gilbert
*Assistant Examiner* — Patrick Maestri
(74) *Attorney, Agent, or Firm* — Laurence A. Greenberg; Werner H. Stemer; Ralph E. Locher

(57) ABSTRACT

Prefabricated stable floor element comprising a supporting element made of concrete, with a service face situated at the top when in use and a bottom face situated on the bottom side, whereby the service face has one or several recesses or openings, characterized in that in at least one of these recesses or openings has been provided an insert element made of rubber or an elastic synthetic material, which insert element reaches as of the inner space in the recess or the opening in which it has been provided in order to fix the insert element, to right underneath, in line with or above the service face, i.e. seen in the position of use of the stable floor element.

20 Claims, 6 Drawing Sheets

STABLE FLOOR ELEMENT

BACKGROUND OF THE INVENTION

Field of the Invention

The present invention concerns a stable floor element.

A known type of stable floor element mainly consists of a grid made of concrete, composed of beams arranged at a distance from one another and which are mutually connected by means of crossbeams, also made of concrete.

Such a stable floor element is described in EP 1,563,728, of which the elements described therein are incorporated in the present text.

Such stable floor elements are manufactured as integrated elements. The openings provided between the beams are designed to carry off the excrements to a cess pit which is usually provided under such a stable floor.

A stable floor which is formed of such known stable floor elements is usually cleaned by regularly scraping the floor, either manually or automatically by means of a manure robot or a scraper, whereby the scraped-off excrements are also carried off via the openings between the beams into the underlying cess pit.

Another type of stable floor has a mainly closed and flat upper surface. In other words, such a stable floor is not formed of beams with intermediate openings. With these types of stable floors, the excrements are carried off by frequently scraping the floor and carrying off the excrements via a restricted number of discharge openings, and further via underlying pipes, for example to a remote collector.

In view of the animals' welfare it is known to provide these known stable floor elements, which are generally made of concrete, with rubber mats on the upper surface.

In a first known embodiment, a mat is integrally provided over the stable floor.

If the stable floor elements are provided with openings or slots via which the excrements fall in an underlying cess pit, said mats will be provided with corresponding recesses, in line with said openings or slots.

Thus, the passage for the excrements is not hindered, and a base is obtained which is integrally coated with rubber.

A disadvantage of this embodiment is that the mat lies loose on the stable floor, and that it can shift while in use or while being scraped.

Fixing these mats to the concrete subfloor is laborious and has as an additional disadvantage that the fixing means, such as for example screws, may cause injuries to the animals.

We also know stable floor elements made of concrete whereby rubber strips or rubber mat parts have been worked into the upper surface during its manufacturing.

A disadvantage thereof is that they cannot be replaced, which strongly reduces the technical life of such stable floor elements.

According to another known embodiment, starting from a concrete floor grid formed of beams and cross beams, the top side of every beam is coated with a rubber strip. This strip is then usually fixed to the beam that it covers. Such rubber strips are described in WO 2006/103534 and in IE 2001/0006.

Fixing these strips is rather problematic. Fixing can be done on the top side or on the side walls of the beam which is covered by the strip.

Fixing such strips is time-consuming, which makes it more difficult to replace them.

Attention should be paid to the prevention of injuries or any discomfort to the animals.

BRIEF SUMMARY OF THE INVENTION

The present invention aims to remedy one or several of the above-mentioned and other disadvantages.

To this end, the present invention concerns a stable floor element comprising a supporting element with a service face situated at the top when in use and a bottom face situated on the bottom side, whereby the service face has one or several levels, recesses or openings, whereby an insert element has been provided in at least one of said levels, recesses or openings made of rubber or an elastic synthetic material, which insert element reaches as of the inner space in the recess or the opening in which it has been provided so as to fix the insert element, to right underneath, in line with or above the service face, i.e. seen in the position of use of the stable floor element.

A major advantage concerns the installation method of the insert elements, which is very simple.

Indeed, the insert elements can be easily put in the recesses or openings without any additional mechanical fixing being required, which could be detrimental to the welfare of the animals.

This results in a very economical stable floor whose insert elements can moreover be easily replaced, for example when they are to be replaced due to wear, or when the stable floor is to be used by other animals.

Another advantage offered by the stable floor element according to the invention is that major parts of the service face of the supporting element remain visible, that it is to say remain accessible to the animals.

Indeed, thanks to its particular position in the recesses or openings in the service face of the supporting element, the insert element according to the invention is very appropriate to keep a major part of or the entire service face of the supporting element freely accessible.

In this manner is obtained a base of concrete alternated with rubber or another elastic material.

This promotes the animals' welfare, since the contact with the concrete service face enables the animals to wear off their hooves or claws. Moreover, the contact with an alternating ground is rougher, which increases the safety.

According to a preferred embodiment, the insert element does not cover the service face of the supporting element at all, or according to a variant embodiment, the insert element only covers the service face of the supporting element to a limited extent, for example such that 5%, 10% or 25% or in-between values of the total service face of the supporting element are covered by the insert element.

In order to prevent the insert elements from being damaged or from being lifted out of the openings, and also to promote a quick discharge of urine, it is advantageous for the insert elements to not reach any higher, at least at the connection with the service face of the supporting elements, than said service face, and in that case to not cover the service face of the supporting elements at all.

However, the invention just as well offers the possibility to entirely cover the concrete parts of the supporting element.

Indeed, depending on the embodiment of the recesses and of the insert elements, the service face of the supporting element remains entirely or partly accessible, or it is entirely hidden and/or it is entirely inaccessible.

The embodiment whereby the supporting element is entirely or partly covered is particularly appropriate for zones one wishes to arrange as what are called rest zones for the animals. In order to prevent the animals from using also the other zones as comfortable zones to lie down, stable floor elements in the other zones can be best provided with insert elements which do not cover the service face of the supporting elements or which only cover it to a limited extent.

The present invention also concerns a supporting element which is part of a stable floor element according to the invention, and a method for manufacturing such a supporting element.

The present invention also concerns an insert element which is part of a stable floor element according to the invention.

In order to better explain the characteristics of the present invention, the following preferred embodiments of a stable floor element according to the invention are described by way of example only without being limitative in any way, with reference to the accompanying drawings, in which:

DESCRIPTION OF THE INVENTION

Figure 1:
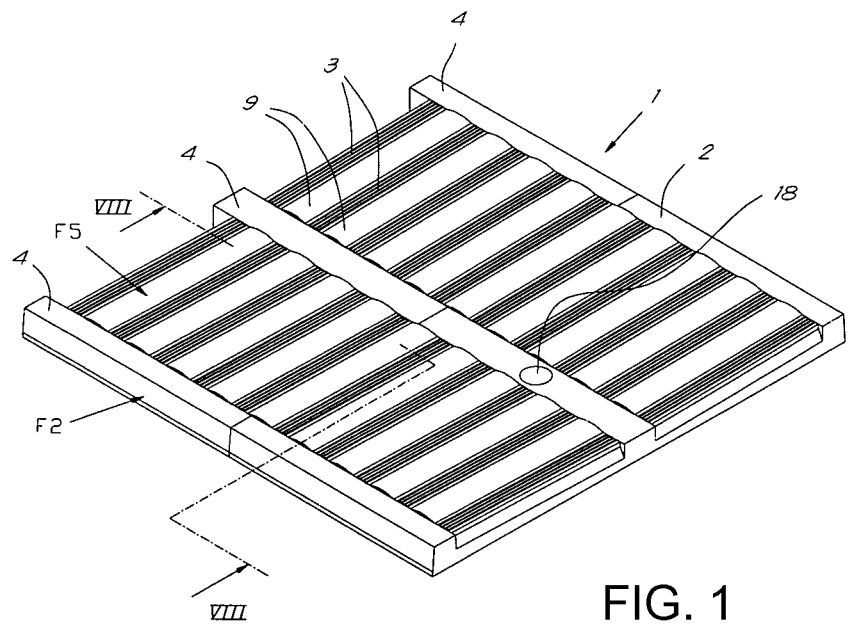
FIG. 1 schematically represents two stable floor elements according to the invention seen in perspective.

FIG. 1 represents a stable floor which is formed of stable floor elements 1 according to the invention.

Figure 2:
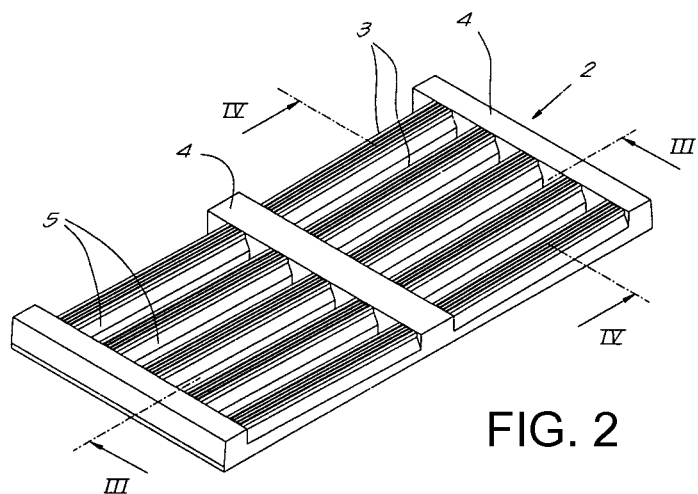
FIG. 2 represents the part indicated by F2 in FIG. 1 to a larger scale.
Figure 3:
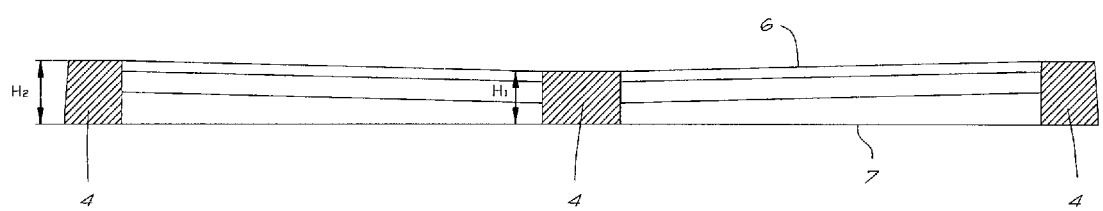
FIG. 3 represents a section according to line III-III in FIG. 2.
Figure 4:
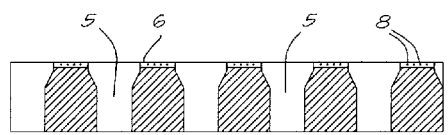
FIG. 4 represents a section according to line IV-IV in FIG. 2.

Every stable floor element 1 comprises a supporting element 2 made of concrete, in this case in the shape of a floor grating 2 as represented in FIGS. 2 to 4.

The floor grating 2 mainly consists of a few beams 3, in this case five parallel beams placed at a distance from one another.

These beams 3 are mutually connected in this case by means of three cross beams 4, namely one at each of the far ends of the beams 3 and one in the middle thereof.

The openings 5 between the beams 3 narrow as of the surface of the floor grating 2 which is situated on top when in use, hereafter called the upper surface of the service face 6 of the floor grating 2, towards the opposite bottom face 7 thereof.

Thus, the beams 3 widen as of the service face 6 to the bottom face 7 of the floor grating 2.

In the given embodiment, the section of the beams 3 as of the service face 6 to the bottom face 7 first has a predominantly constant width, up to some 2 cm under the service face 6, and then the section widens as a slanting wall part has been provided on both sides of the beam 3 which reaches up to 6 cm under the service face 6, after which the beam 3 reaches up to the bottom face 7 with a predominantly constant width.

The service face 6 of the floor grating 2 is in this case provided with grooves 8 or unevennesses or the like, but this is merely optional.

The cross beam 4 situated in the middle of the beams 3 has a height H1 which is somewhat smaller than the height H2 of the cross beams 4 situated at the far ends.

Also the beams 3 have a varying height, such that the service face 6 of the floor grating 2, formed of the upper surfaces of the beams 3 and the cross beams 4, is free of any sudden transitions.

To this end, the beams 3 have a height which is mainly equal to H1 near their connection with the cross beam 4 situated in the centre, whereas the beams 3 have a height H2 near their connection with the cross beams 4 situated at the far ends.

Figure 5:
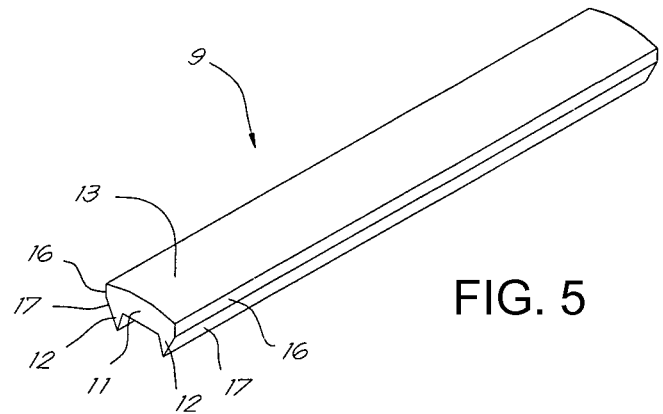
FIG. 5 represents the part indicated by F5 in FIG. 1 to a larger scale.
Figure 6:
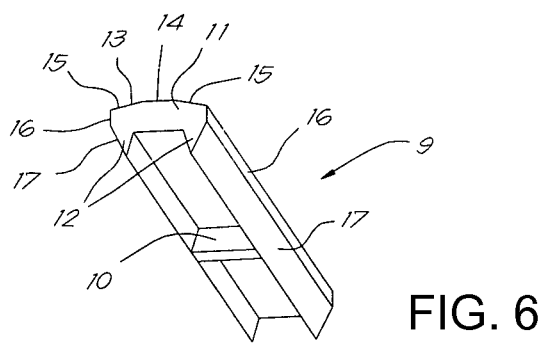
FIG. 6 represents the element of FIG. 5, but in another position.

Apart from the above-mentioned floor grating 2, every stable floor element 1 also comprises an insert element 9, in this case made of rubber and shaped as represented in FIGS. 5 and 6. Rubber is strong and guarantees a long life of the insert elements 9, and at the same time rubber is soft enough to the animals' claws.

The shape and dimensions of the insert element 9 are such that it can be provided exactly in an opening 5 between the beams 3 of the floor grating 2.

The insert element 9 thereby reaches as of the inner space of the opening 5, i.e. in this embodiment the space between the beams 3 in which the insert element 9 has been provided so as to fix it, up to the service face 6.

The insert element 9, made as a moulded piece here, generally has a predominantly U-shaped section with a body 11 and two legs 12, apart from a reinforcement rib 10 provided centrally on the bottom side of the insert element 9.

In the given embodiment, the side of the body 11 which is situated at the top when in use, hereafter called the top of the insert element 9, is made convex. Thus, the central part 14 of the insert element 9 reaches somewhat higher than the service face 6 of the supporting element 2.

In the given embodiment, the top 13 is provided in particular with a central part 14 which is made flat and with slanting parts 15 on either side which in this case connect to the service face 6 of the supporting elements 2.

The side walls 16 of the body 11 are mainly directed parallel to the plane of symmetry of the insert element 9.

The legs 12 of the predominantly U-shaped section narrow towards their free ends, such that the outer sides 17 of the legs 12 and the side walls 16 of the body 11 mainly correspond to the design of the beams 3 as far as shape and dimensions are concerned there where the insert elements 9 are inserted.

Figure 8:
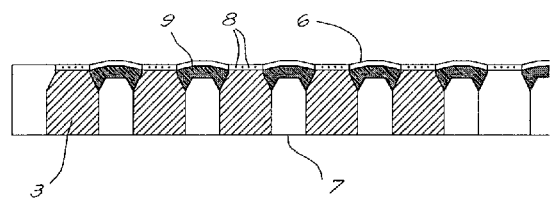
FIG. 8 represents a section according to line VIII-VIII in FIG. 1.
Figure 7:
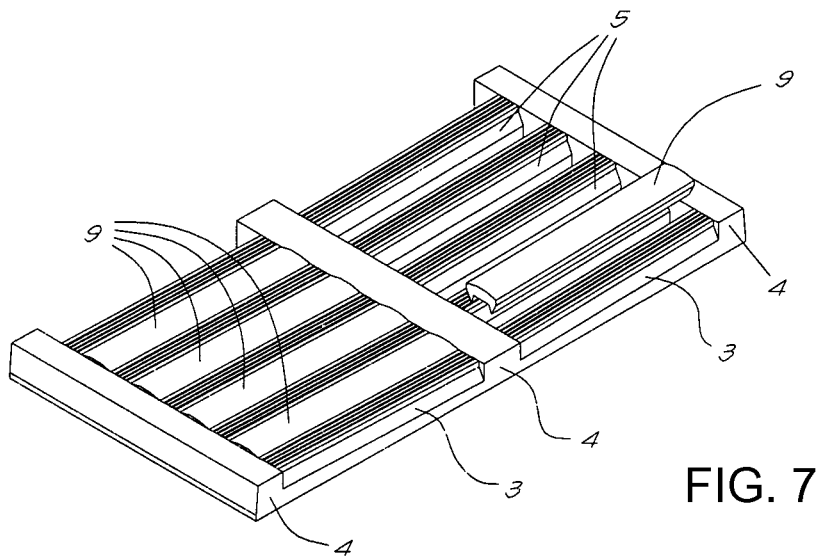
FIG. 7 represents the element of FIG. 2, in which are provided some elements according to FIG. 5.

When inserted, as represented in FIGS. 7 and 8, the top 13 of the insert element 9 extends somewhat above the upper surface 6 of the floor grating 2, but this is not required for the application of the invention.

The installation method of a stable floor grating 1 according to the invention as discussed above is simple and as follows.

The concrete floor gratings 2 are put on the underlying structure, i.e. in the case of the embodiment as discussed above, for example on a solid floor in which may have been provided sewers. Some of the floor gratings 2 may have been provided with a discharge opening 18 as represented in FIG. 1, and they are aligned and connect to the sewers which are connected to a collector.

FIG. 7 illustrates how the insert elements 9 can be easily provided on the floor gratings 2.

Indeed, thanks to the predominantly corresponding design of the insert elements 9 with the openings 5 between the beams 3 of the floor gratings 2 as mentioned above, one only has to put the insert elements 9 with their conical bottoms in the funnel-shaped openings 5.

Said design or any other appropriate and corresponding design of the insert elements 9 and the recesses or openings 5 in the supporting elements 2 makes it possible to easily put the insert elements 9 in the recesses or openings 5. As there are no additional mechanical connections, the insert elements 9 can be easily installed and replaced. Also gluing of the insert elements 9 is a possibility that may be considered.

The use and working of such stable floor elements 1 is simple and as follows.

The stable floor elements 1 provide for optimal comfort to the animals. The insert elements 9 provide for a softer and warmer ground on the one hand, and the concrete beams 3 and 4 make sure that the animals can wear off their hooves or claws on the other hand.

Moreover, any possible alternation of concrete and rubber guarantees a rougher contact surface, which improves the safety.

As opposed to stable floors that are entirely covered with rubber mats, a stable floor formed of such stable floor elements 1 according to the invention offers the advantage that the animals will not only make their way to those places where said mats are provided. Thus, the infrastructure will be used as a whole, i.e. also the cubicles.

The cross beam 4 situated in the centre of the beams 3 has a height H1 which is somewhat smaller than the height H2 of the cross beams 4 situated at the far ends.

Also the beams 3 slope down to these lower, centrally situated cross beams 4. Consequently, also the insert elements 9 will slope in the intermediate openings 5. This implies that any liquid excrements will already find their way to the centrally situated cross beams 4 as a result of the gravitational force.

If the underlying structure has been made such that also the floor gratings 2 with the discharge openings 18 are situated the lowest, then the liquid excrements will be automatically discharged.

This speedy discharge of urine is important to reduce the methane (CH4) and ammonia (NH3) emissions.

Irrespective of the above-mentioned slopes, an insert element 9 can also be provided with grooves in view of a quicker urine discharge, preferably in line with any possible grooves 8 in the service face 6 of the supporting element 2, such that this succession of grooves forms a discharge channel.

The grooves 8 in the supporting element 2 and also the grooves in the insert elements 9 moreover provide the animals with a better grip.

If the grooves 8 are provided in the supporting element 2, they will be preferably directed crosswise to the longitudinal direction of the insert elements 9, and in this case they will preferably not be provided at the cross beams 4, since a direct discharge of urine cannot be provided for there.

The remaining excrements are carried off by regularly scraping the floor and carrying off the excrements via the discharge openings 18, and further to a collector via a pipe system which is not represented.

Should the insert elements 9 be worn-out, they can be easily replaced.

If required, the bottom face 7 of the floor gratings 2 may be closed. In that case, the openings 5 are made as recesses or levels in the upper surface of the service face 6 of the floor grating 2, as opposed to the continuous openings 5 as represented in the figures.

Such a closed bottom face 7 prevents any contamination of the ground should there be a leak between the insert elements 9 and the floor gratings 2.

If required, such floor gratings can be placed directly on a flattened ground.

It is clear that the sloping embodiment of the beams 3 is not necessary, but it results in a faster discharge of the liquid excrements, which implies reduced methane (CH4) and ammonia (NH3) emissions.

It is also clear that the supporting elements 2 must not necessarily be floor gratings as described above.

A supporting element 2 must not necessarily have cross beams 4. Indeed, the embodiment with a closed bottom face 7 can also be realised without any cross beams 4.

The supporting element 2 may have a predominantly rectangular circumferential edge but this must not necessarily be so, and the recesses 5 may for example also be round or hexagonal or have any other shape whatsoever. The supporting element 2 may be a floor slab for example, cast on the spot, in which are provided levels or recesses.

Figure 9:
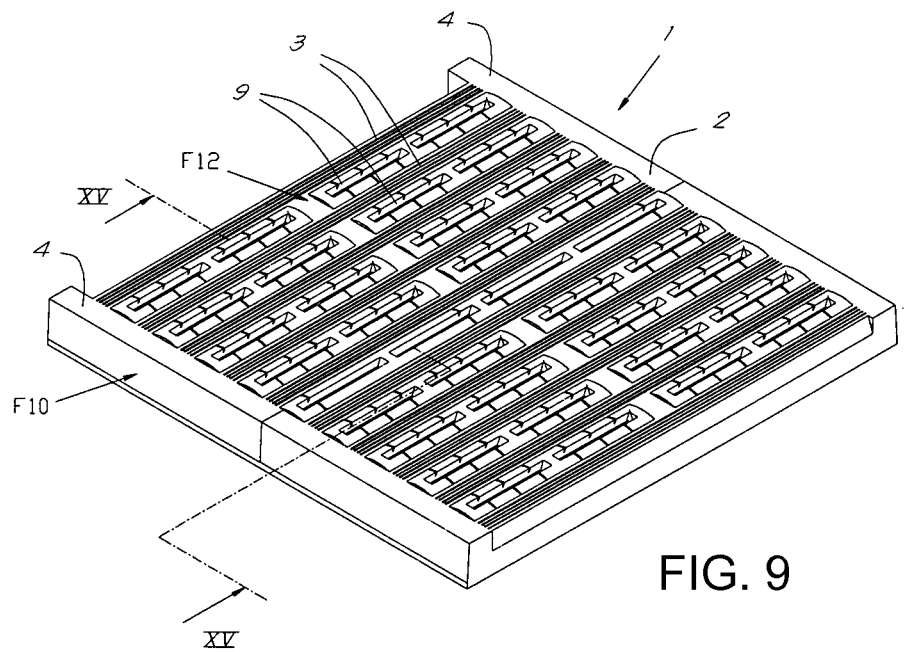
FIG. 9 schematically represents two stable floor elements according to the invention, seen in perspective, but according to an alternative embodiment.

FIG. 9 shows an alternative embodiment of a stable floor which is formed of stable floor elements 1 according to an alternative embodiment.

Figure 10:
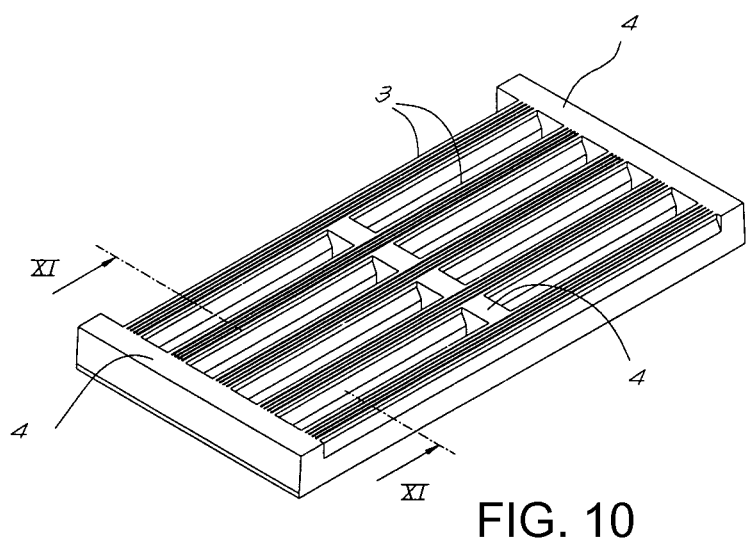
FIG. 10 represents the part indicated by F10 in FIG. 9 to a larger scale.
Figure 11:
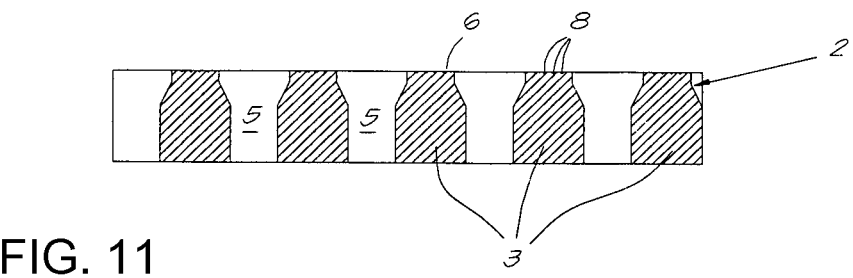
FIG. 11 represents a section according to line XI-XI in FIG. 10.

Every stable floor element 1 comprises a supporting element 2, as in the embodiment discussed above, for example a concrete floor grating 2 which serves as a supporting structure, as represented in FIGS. 10 to 11.

These floor gratings 2 mainly differ from the above-described floor gratings 2 in that they have a larger height and in that the beams 3 do not have a varying height, as a result of which they slope down towards the centrally situated cross beam 4.

Figure 12:
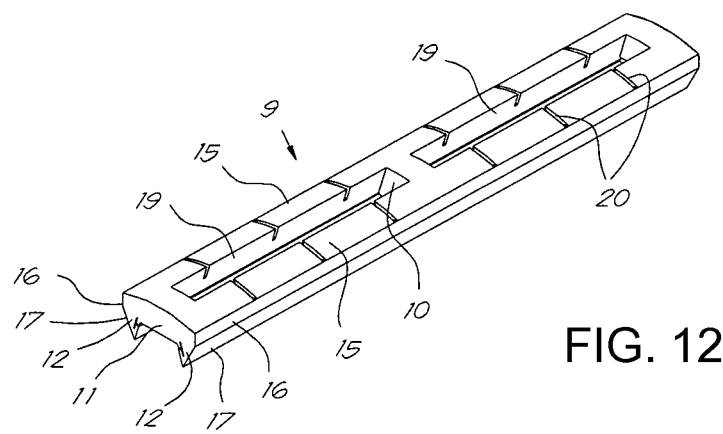
FIG. 12 represents the part indicated by F12 in FIG. 9 to a larger scale.
Figure 13:
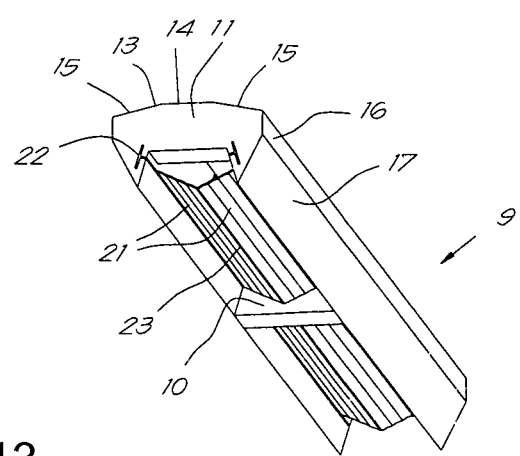
FIG. 13 represents the element of FIG. 12, but in another position.

Apart from the above-described floor grating 2, every stable floor element 1 according to this variant embodiment also comprises an insert element 9, in this case mainly made of rubber and represented in FIGS. 12 and 13.

The design and dimensions of the insert element 9 are such that it can be provided exactly between the beams 3 of the floor grating 2.

Such an insert element 9 differs from the above-described insert elements 9 in that its body 11 is provided with two slotted and continuous openings 19 situated in each other's prolongation.

These openings 19 are provided in the central part 14 of the body 11 and they reach from near the free end of the insert element 9 up to a distance from the reinforcement rib 10, which is extended here up to the upper surface 13 of the insert element 9.

Further, the upper surface 13 of the insert elements 9 is provided with small channels 20 in this case, provided in the upper surface of the slanting parts 15 on either side of the openings 19.

Said small channels 20 are designed such that, as opposed to the laterally sloping parts 15, they slope down from the side walls 16 towards the openings 19.

In the given embodiment, said insert elements 9 are provided with two elastic, springy strips 21 at each opening 19, made of an elastic synthetic material, in this case and preferably EPDM, given its favourable elastic qualities and its chemical resistance to ammonia.

Said springy strips 21 have been provided on the legs 12 of the insert element 9 in this case, in particular by means of T-shaped profiled far ends which have been led in corresponding grooves 22 in the legs 12.

Naturally, this can also be done in alternative manners, for example by making the springy strips 21 sufficiently wide and by providing them partly between the outer sides 17 of the legs 12 of the insert element 9 on the one hand, and the beams 3 on the other hand.

To that end, the legs 12 and/or the beams 3 can be best tuned to one another as far as shape and dimensions are concerned, but provided some space is left to apply a part of the springy strips 21.

The springy strips 21 may be provided with recesses and/or protrusions at the clamping part which can work in conjunction with protrusions and/or recesses at the legs 12 and/or the beams 3, which is particularly useful when installing the springy strips 21.

The application of such springy strips 21 is simple, and they can also be applied after the basic embodiment of the stable floor elements 1 has been taken into use without any springy strips 21.

The design of the springy strips 21 is such that two opposite springy strips 21 are somewhat directed downward when unloaded, but in such a way that their free ends 23 connect and thus seal off the underlying collector.

The installation method of a stable floor grating 1 according to the invention and as represented in FIGS. 9 to 13 is simple and largely corresponds to the installation method of the stable floor grating 1 as represented in FIGS. 1 to 8.

The concrete floor gratings 2 that are made higher are suitable to be applied above a collector for excrements thanks to their higher bending strength.

Figure 14:
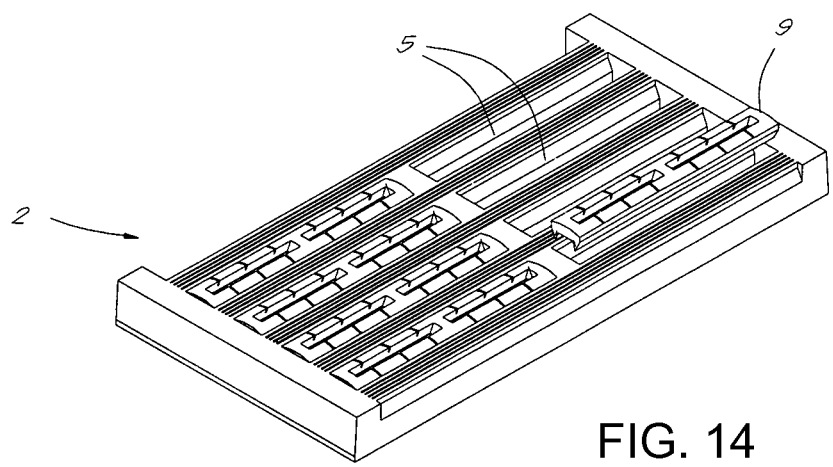
FIG. 14 represents the element of FIG. 10 in which have been provided some elements according to FIG. 12.
Figure 15:
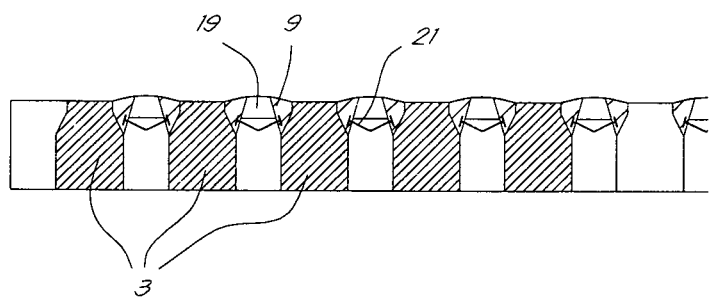
FIG. 15 represents a section according to line XV-XV in FIG. 9.

The insert elements 9 are provided in the openings 5 between the beams 3, also when they have been provided with elastic springy strips 21, as represented in FIGS. 14 and 15, in correspondence with the installation method of the insert elements 9 represented in FIGS. 5 to 7 with all the related advantages.

As mentioned above, the benefit of alternating concrete and rubber strips relates to the animals' welfare, the wear of their hooves or claws, a better grip and the use of the infrastructure as a whole since there are no floor parts that are integrally coated with rubber.

The use and working of such stable floor elements 1 is simple and as follows.

The excrements are carried off via the slotted openings 19 in the comfort elements 9.

As the floor can be scraped on a regular basis, this results in an accelerated discharge of the excrements via the slotted openings 19 to the underlying collector.

Urine and liquid excrements are optimally discharged at an increased speed via the small channels 20 which are provided in the upper surface of the slanting parts 15 on either side of the openings 19.

The elastic springy strips 21, whose free ends 23 connect when they are unloaded, are made of a synthetic material or a rubber, in this case EPDM, with low adhesive power, and they are provided with a smooth upper surface, such that excrements which end up on said strips force the latter down by their weight, after which the excrements end up in the underlying pit, and after which the strips bend up again and connect, thus sealing the collector.

In other words, the elastic springy strips 21 serve as a self-closing valve.

This is important as the thus screened collector reduces any methane (CH4) and ammonia (NH3) emissions.

Should the insert elements 9 show signs of wear, they can be easily replaced.

It is clear that the beams 3 may also slope here.

As an alternative, it is possible to provide the insert elements 9 with a flat top 13 and possibly in line with the service face 6 of the supporting elements 2, which is particularly advantageous when using a dung scraper.

Alternatively, the insert elements 9 can also be provided with a concave top 13, which is advantageous in that urine and other excrements will be at all times discharged faster. The lower part of the top is then situated for example 1 mm, 2 mm or a few millimeters under the highest part of the insert element 9 when in use.

In such an embodiment, the small channels 20 as mentioned above are less important or they can even be omitted.

The insert elements 9 may be designed such that the upper surfaces 13 of the insert elements 9 are situated under the service face 6 of the supporting element 2.

In order to prevent the insert elements 9 from being damaged or from being lifted out of the openings 5, and also to promote a fast discharge of urine, it is advantageous if the insert elements 9 do not reach any higher than the service face 6, at least at the connection with the service face 6 of the supporting elements 2.

It is clear that insert elements 9 may be provided with appropriate openings 19, corresponding to the animals one wishes to keep in the stable concerned.

The openings 19 can be made wider or narrower, they can be slotted or have any other shape whatsoever.

This advantage gives the cattle breeder much flexibility, since he is not bound to his initial stock when selecting the stable floor.

In order to switch from full-grown cattle to calves for example, the cattle breeder can merely replace the insert elements 9 with wider openings 19 by insert elements 9 with narrower openings 19.

It is clear that a whole range of insert elements 9 can be provided.

Depending on the type of animals for which the insert elements 9 are meant, the width and shape of the openings 19 can be adjusted, just as the used material, the colour or for example the slope of the slanting parts 15, or even no slope at all may be provided, such that the upper surfaces 13 of the insert elements 9 are in line with the service face 6.

The insert elements 9 may be such that the upper surfaces of the insert elements 9 are situated significantly above the service face 6 of the supporting element 2, for example as they are provided with a highly convex upper surface 13, should this promote the welfare of the animals.

Also the small channels 20 are optional, and, if provided, their dimensions can be adjusted to the aimed application.

The top 13 of an insert element 9, irrespective of the embodiment, can be made somewhat wider than the distance between the beams 3, such that the insert elements 9 can be placed between the beams 3 to a large extent, but whereby the top largely covers the beams 3, such that an appropriate rubber/concrete ratio is obtained.

The extent to which the insert elements 9 cover the concrete beams 3 can thereby be such that the concrete parts of the service face 6 of the supporting element 2 do not remain visible or only to a limited extent, for example for 10%, 20%, 30%, 40%, 50%, 60%, 70%, 80%, 90% or 100% or any intermediate value.

It is clear that variant insert elements 9 can be provided whose top 13, irrespective of their design, is made generally wider than the section of the recess 5 at the service face 6 of the supporting element 2.

According to a special embodiment, a floor grating 2 according to the invention is provided with a slot, not shown in the figures, for example in the top of and in line with the centre beam 4, in which the feeder cable of a scraping device can be led.

The present invention is by no means limited to the embodiments described by way of example and represented in the accompanying drawings; on the contrary, such a stable floor element according to the invention can be made in all sorts of shapes and dimensions while still remaining within the scope of the invention.

The invention claimed is:

1. Prefabricated stable floor element comprising:
   a concrete supporting element having a top side defining a service face when in use and a bottom side defining a bottom face for supporting the supporting element when in use, the supporting element being a floor grating defined by several beams disposed spaced apart from one another for defining openings or recesses between the beams, the beams being mutually connected by cross beams, the beams widening in a direction from the service face to the bottom face resulting in the openings or recesses narrowing in the direction from the service face to the bottom face;
   a rubber or an elastic synthetic material insert element being provided in at least one of the openings or recesses, the insert element reaches into an inner space of the recess or the opening for fixing the insert element to one of beneath, in line with or above the service face.

2. Stable floor element according to claim 1, wherein the insert element in the inner space of the recess or the opening connects to at least two opposite walls for immobilizing the insert element.

3. Stable floor element according to claim 1, wherein the beams have a cross section which in the direction from the service face to the bottom face, first has a predominantly constant width and then gradually widens to a predominantly constant width, which continues to the bottom face.

4. Stable floor element according to claim 1, wherein the service face is provided with grooves or unevennesses.

5. Stable floor element according to claim 1, wherein the service face of the supporting element slopes towards the bottom face, either to a centrally or a peripherally situated zone of the supporting element.

6. Stable floor element according to claim 1, wherein the beams are mutually connected by three of the cross beams, one at each far end of the beams and one in a middle thereof.

7. Stable floor element according to claim 6, the cross beam situated in the middle has a height which is smaller than the height of the cross beams situated at the far ends, and the beams have a varying height, such that the service face of the floor grating, formed of the upper surfaces of the beams and the cross beams, is free of any sudden transitions.

8. Stable floor element according to claim 1, wherein the shape and dimensions of the insert element are such that insert element is provided exactly in the recess or in the opening, between the beams of the floor grating, and is thus immobilized.

9. Stable floor element according to claim 8, wherein the insert element in general has a U-shaped section with a body and two legs.

10. Stable floor element according to claim 9, wherein a top side of the body when in use, being the top of the insert element, is made convex.

11. Stable floor element according to claim 9, wherein the top of the insert element is provided with a central part which is made flat and with a slanting part on either side thereof.

12. Stable floor element according to claim 9, wherein the body is provided with side walls, and in that the legs are provided with outer sides, the shape and dimensions of the side walls and of the outer sides mainly correspond to the shape and dimensions of the opening between the beams.

13. Stable floor element according to claim 1, wherein the insert element is provided with one or several continuous openings.

14. Stable floor element according to claim 11, wherein one or several continuous openings are provided in the central part of the body.

15. Stable floor element according to claim 12, wherein the insert element is provided with one or several small channels provided in the upper surface of the insert element.

16. Stable floor element according to claim 12, wherein the insert element is provided with springy strips made of an elastic synthetic material or rubber, and whose free ends connect when not loaded.

17. Stable floor element according to claim 1, wherein the insert element does not cover the service face of the supporting element at all and thus leaves it entirely free.

18. Stable floor element according to claim 1, wherein the openings or recesses pass entirely through the supporting element from the service face to the bottom face.

19. Prefabricated concrete supporting element for a stable floor, the supporting element comprising:
   a top side defining a service face when in use and a bottom side defining a bottom face for supporting the supporting element when in use, the supporting element being a floor grating defined by several beams disposed spaced apart from one another for defining openings or recesses between the beams, the beams being mutually connected by cross beams, the beams widening in a direction from the service face to the bottom face resulting in the openings or recesses narrowing in the direction from the service face to the bottom face, the recesses or openings extending from the service face to the bottom face.

20. The supporting element according to claim 19, further comprising a rubber or an elastic synthetic material insert element provided in at least one of the recesses or openings, the insert element reaching into an inner space of the recess or the opening for fixing the insert element to one of beneath, in line with or above the service face.

* * * * *